Figure 1:
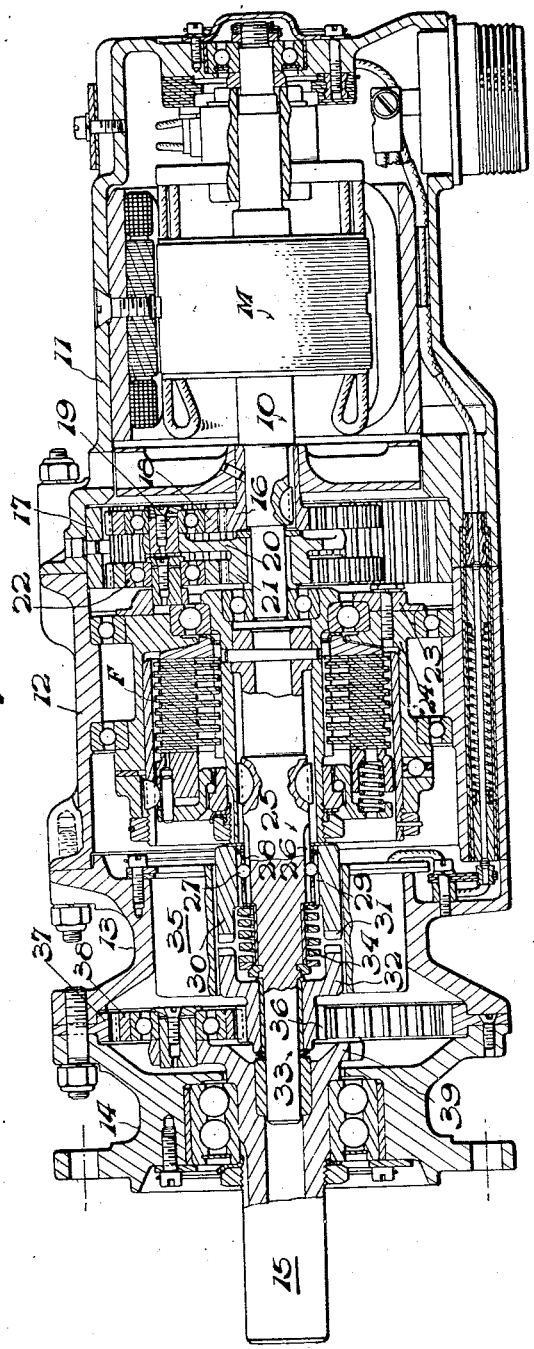

Oct. 8, 1946.   R. M. NARDONE   2,408,993
ACTUATOR UNIT FOR RETRACTABLE LANDING GEARS
Filed May 16, 1944

INVENTOR.
Romeo M. Nardone.
BY
Herbert L. Davis, Jr.
ATTORNEY

Patented Oct. 8, 1946

2,408,993

UNITED STATES PATENT OFFICE 2,408,993

ACTUATOR UNIT FOR RETRACTABLE LANDING GEARS

Romeo M. Nardone, Teaneck, N. J., assignor to Bendix Aviation Corporation, Teterboro, N. J., a corporation of Delaware Application May 16, 1944, Serial No. 535,859

2 Claims. (Cl. 192—.01)

This invention has to do with actuator units employed in conjunction with retractable landing gears and is concerned primarily with transmission of power from the motor to the output shaft.

A unit of this character, which is now meeting with widespread use, ordinarily includes a motor having a drive shaft and an output shaft which is operatively connected to the landing gear itself. Between the motor drive shaft and the output shaft are a gear train, friction clutch device, and a clutch mechanism which is operable either to establish or break the connection to the output shaft.

Heretofore it has been the practice to locate this main control clutch closely adjacent to the output shaft, in which position the clutch elements are driven subsequent to the full gear reduction. When so located, it becomes necessary to make the jaw clutch elements sufficiently massive to withstand the full torque developed at this point, which is a somewhat undesirable factor. In addition, the separating of the jaws as soon as its meshing solenoid is de-energized, has also presented some difficulties.

When the motor of an actuator unit of this type is stopped, it is of the utmost importance that the output shaft be brought to a standstill as quickly as possible. Accordingly, it has been the practice to provide means for separating the jaw clutch elements which control the drive to the output shaft, substantially instantaneous with discontinuance of power to the motor.

In accordance with conventional practice, a solenoid ordinarily maintains the jaw clutch elements in meshing relation against the influence of a spring which tends to separate the clutch elements. When current to the solenoid is discontinued, this spring is supposed to separate the jaw clutch elements and thus discontinue the delivery of power to the output shaft. However, with the massive clutch elements heretofore necessary, and with the full torque developed at this point, the springs have not functioned to separate the jaw clutches as promptly as possible.

With these conditions in mind, this invention has in view as its foremost objective, the provision of an actuator unit of the character aforesaid, which includes the usual output shaft and main control clutch, as above outlined, but in addition one step of the gear train is interposed between these elements.

With this arrangement, full torque is not developed on the clutch elements, and it is possible to use a much lighter jaw clutch than had been thought possible. Moreover, the spring which separates the clutches operates with a sureness heretofore lacking, and the drive to the output shaft is promptly discontinued when power to the unit is cut off.

It is now common practice to employ a planetary gear train for the gear reduction. This train usually consists of three stages, and in accordance with this invention, one of these stages is interposed between the main control clutch and the output shaft.

Various other more detailed objects and adventages of the invention such as arise in connection with carrying out the above noted thoughts in a practical embodiment will in part become apparent, and in part be hereinafter stated as the description of the invention proceeds.

The invention, therefore, comprises an actuator unit for retractable landing gears, including a motor having a drive shaft, a train of planetary gears, including three stages, a main control clutch, and an output shaft with one of the stages of the gear train interposed between the main control clutch and the output shaft.

Figure 2:
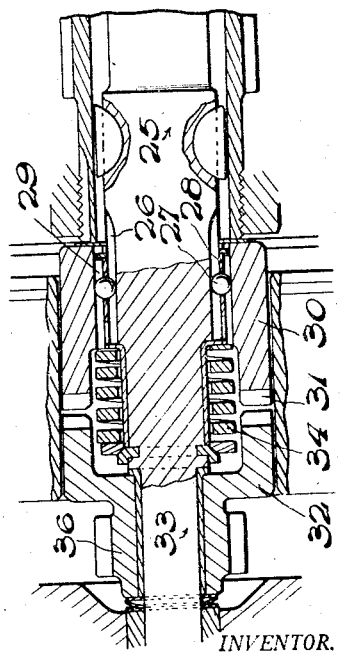

For a full and more complete understanding of the invention, reference may be had to the following description and accompanying drawing, wherein:

Fig. 1 is a view taken through an actuator unit embodying the precepts of this invention; and Fig. 2 is an enlarged detailed sectional showing of the main control clutch mechanism.

Referring now to the drawing wherein like reference characters denote corresponding parts, and first more particularly to Fig. 1, an actuator unit made following the teachings of this invention is shown comprising a motor identified by the reference character M and which motor includes a drive shaft 10. The motor M, together with the drive shaft 10 and the various electrical instrumentalities associated therewith, ordinarily are assembled in a casing section designated 11. Bolted to the casing section 11 is an intermediate casing section 12, which houses a portion of the planetry gear train, as will be later pointed out, and a friction clutch assembly which is referred to in its entirety by the reference character F.

Another casing section 13 is attached to the section 12, and an end casing section 14 is in turn secured to the section 13. The output shaft is shown at 15 as being mounted on bearings within the casing section 14.

The drive shaft 10 carries a sun pinion 16, while the casing section 11 has affixed thereto in immovable relation, an orbit gear annulus 17 which is internally toothed. A set of planet gears 18 mesh with the sun gear 16 and the orbit gear 17. These planets 18 are formed with hubs in the form of bearings which receive stub shafts 19 that extend from a planet carrier 20. The carrier 20 is in turn formed with a sun gear 21, and another set of planets 22 mesh with the sun gear 21 and the annulus 17. This set of planets 22 is carried by stub shafts extending from a ring-like plate 23 that is secured to a sleeve 24 forming a part of the friction clutch assembly F.

It is not deemed necessary to here go into a detailed description of the friction clutch device F, because mechanisms of this type are old and well known in this as well as other arts. It suffices to point out that the sleeve 24, through the medium of the friction clutch discs, drives a shaft 25.

Referring now more particularly to Fig. 2, the shaft 25 is shown as formed with key ways 26 which receive key elements in the form of balls 27. The latter are held in position by a cage 28 and are also received in key slots 29 formed in a sliding jaw clutch element 30. It is evident that the jaw clutch element 30 is in driving relation with respect to the shaft 25 due to the key structure described, and furthermore is slidable on the shaft 25, as will be later pointed out.

The jaw clutch 30 is formed with teeth 31 which are adapted to mesh with complemental teeth on a fixed jaw clutch element 32 that is drivably carried on a shaft section 33. A coiled expansion spring 34 is interposed between the jaw clutch elements 30 and 32 and normally exerts a force tending to spread these jaw clutch elements. If this force is not opposed, the clutch elements 30 and 32 will assume the separated position illustrated in the drawing.

A solenoid represented at 35 is disposed about the clutch assembly, and when energized serves to move the jaw clutch 30 against the influence of the spring 34 and causes the teeth 31 to establish the driving relation to jaw member 32. The shaft 33 supports sun pinion 36, while an orbit gear annulus 37 has a radial flange that is clamped between the anchoring flanges of the casing sections 13 and 14 and is thus held immovable. A set of planet gears 38 mesh with both the sun gear 36 and the orbit gear 37. These planets 38 are carried by stub shafts extending from a planet gear carrier 39 that is formed as an integral part of the output shaft 15.

While the operation of the above described mechanism is believed to be obvious, it may be briefly outlined by noting that when the actuator unit is to be rendered effective, the motor M and solenoid 35 are energized at the same time. Thus, the jaw clutch elements 30 and 32 are brought into meshing relation to establish the driving connection from the motor shaft 10 to the output shaft 15. At the same time the motor starts to drive the shaft 10.

The drive of this shaft is reduced by the planetary gear stages interposed between the motor M and friction clutch F, and in this partially reduced state is supplied to the clutch elements 30 and 32. The drive is further reduced by the stage of planetary gear reduction provided by the sun gear 36, orbit gear 37 and planets 38.

It is evident that the torque at the location of the clutch elements is not as great as it would be if this clutch was connected directly to the output shaft. It is thus possible to employ comparatively light clutch parts which are readily separated by the spring 34 when power to the unit is discontinued. It is evident that when the motor M is cut off, the solenoid 35 is also de-energized so that the spring 34 is again rendered effective to spread the clutch elements 30 and 32.

While only one embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In an actuator unit for a retractable landing gear, a motor having a drive shaft, gear mechanism operatively connected to said drive shaft and constituting two stages of gear reduction, a main control clutch comprising two jaw clutch elements, a spring tending to separate said elements, and a solenoid adapted to be energized to bring said elements into meshing engagement, a friction clutch assembly operatively connecting one of said jaw clutch elements to said gear mechanism, gear mechanism operatively connected to the other of said jaw elements and constituting another stage of said gear reduction, and an output shaft drivably connected to the last said gear mechanism.

2. In an actuator adapted for operation by the drive shaft of a motor for slowly turning an output shaft, the combination of a first reduction gearing mechanism adapted to be operatively connectable to said drive shaft, a main control clutch comprising two jaw clutch elements, a spring tending to separate said elements, and a solenoid adapted to be energized to bring said elements into meshing engagement; a friction clutch assembly operatively connecting one of said jaw elements to said reduction gearing mechanism, and a second reduction gearing mechanism adapted to be operatively connectable to the other of said jaw elements and to said output shaft.

ROMEO M. NARDONE.